United States Patent
Oh et al.

(10) Patent No.: US 11,588,157 B2
(45) Date of Patent: Feb. 21, 2023

(54) IRIDIUM ALLOY CATALYST HAVING REVERSIBLE CATALYTIC ACTIVITY AND PREPARATION METHOD THEREOF

(71) Applicant: KOREA INSTITUTE OF SCIENCE AND TECHNOLOGY, Seoul (KR)

(72) Inventors: Hyung Suk Oh, Seoul (KR); Woong Hee Lee, Seoul (KR); Byoung Koun Min, Seoul (KR); Yun Jeong Hwang, Seoul (KR); Ung Lee, Seoul (KR); Dong Ki Lee, Seoul (KR); Da Hye Won, Seoul (KR); Jai Hyun Koh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 79 days.

(21) Appl. No.: 17/197,893

(22) Filed: Mar. 10, 2021

(65) Prior Publication Data
US 2021/0328229 A1    Oct. 21, 2021

(30) Foreign Application Priority Data

Mar. 10, 2020    (KR) .................. 10-2020-0029668

(51) Int. Cl.
| | |
|---|---|
| H01M 8/04 | (2016.01) |
| H01M 4/90 | (2006.01) |
| C25B 11/089 | (2021.01) |
| B22F 1/142 | (2022.01) |
| H01M 4/86 | (2006.01) |

(52) U.S. Cl.
CPC .......... *H01M 4/9041* (2013.01); *B22F 1/142* (2022.01); *C25B 11/089* (2021.01); *B22F 2301/25* (2013.01); *H01M 2004/8684* (2013.01)

(58) Field of Classification Search
CPC ...................................... H01M 8/04
See application file for complete search history.

(56) References Cited

PUBLICATIONS

Wang ("Synthesis of Ni—Ir Nanocages with Improved Electrocatalytic Performance for the Oxygen Evolution Reaction" Chao Wang, Yongming Sui, Man Xu, Chuang Liu, Guanjun Xiao, and Bo Zou ACS Sustainable Chemistry & Engineering 2017 5 (11), 9787-9792).*

* cited by examiner

*Primary Examiner* — Jacob B Marks (57) ABSTRACT

Proposed is an iridium alloy catalyst having reversible catalytic activity for an oxygen evolution reaction (OER), a hydrogen evolution reaction (HER), and a hydrogen oxidation reaction (HOR) by including an iridium alloy including iridium (Ir) and nickel (Ni). The iridium alloy catalyst according to the present disclosure is rapidly converted to an iridium alloy catalyst in an oxide form and an iridium alloy catalyst in a metallic form according to applied voltage by controlling its crystallinity. Thus, even in case an oxide layer is formed after the OER, the oxidation layer disappears during the HER and HOR and the properties of an iridium metal catalyst remain, thereby maintaining HER/HOR performance.

10 Claims, 10 Drawing Sheets
(10 of 10 Drawing Sheet(s) Filed in Color)

IRIDIUM ALLOY CATALYST HAVING REVERSIBLE CATALYTIC ACTIVITY AND PREPARATION METHOD THEREOF

CROSS REFERENCE TO RELATED APPLICATION

The present application claims priority to Korean Patent Application No. 10-2020-0029668, filed Mar. 10, 2020, the entire contents of which is incorporated herein for all purposes by this reference.

BACKGROUND OF THE INVENTION

Field of the Invention

The present disclosure relates generally to an iridium alloy catalyst having reversible catalytic activity and a preparation method thereof and, more particularly, to a catalyst that enables an oxygen evolution reaction (OER), a hydrogen evolution reaction (HER), a hydrogen oxidation reaction (HOR), and a preparation method thereof.

Description of the Related Art

This section provides background information related to the present disclosure which is not necessarily prior art.

A fuel cell is an electrochemical energy conversion device in which an electric current is generated by migration of electrons during an electrochemical reaction between an anode (hydrogen oxidation reaction (HOR)) and a cathode (oxygen reduction reaction (ORR)). Such a fuel cell typically includes two half cells separated by a membrane, and a material (platinum on carbon (Pt/C)) in which platinum nanoparticles are supported on a carbon support is used as a catalyst used for each electrode. Among problems that occur when Pt/C is applied to an actual fuel cell, corrosion of the anode is known as a major cause of degrading the durability of the fuel cell.

For example, a fuel cell using hydrogen ($H_2$) and air ($O_2$) as fuels obtains electrical energy through the following electrochemical reaction.

Hydrogen electrode (anode): $2H_2 \rightarrow 4H^+ + 4e^-$-(HOR)

Oxygen electrode (cathode): $O_2 + 4H^+ + 4e^- \rightarrow 2H_2O +$ Heat

At this time, when the supply of hydrogen is cut off, such as in an on/off condition, air from the oxygen electrode diffuses toward the hydrogen electrode with the result that a reverse voltage is generated at the hydrogen electrode. In this process, the following carbon oxidation reaction occurs at the hydrogen electrode, generating a voltage of equal to or greater than 1.23 V, which leads to corrosion of the carbon support and a degradation in the performance of the catalyst.

$C + 2H_2O \rightarrow CO_2 + 4H^+ + 4e^-$

To address this problem, iridium oxide ($IrO_2$) may be added to the hydrogen electrode together with Pt/C, thus suppressing corrosion of carbon under a reverse voltage condition and inducing a water splitting reaction. However, $IrO_2$ is difficult to convert to metallic iridium (Ir) due to its irreversible properties, and thus does not participate in the HOR, which is a normal operating reaction of the fuel cell, but reduces a catalytic active area of Pt/C, resulting in a degradation in the performance of a fuel cell system.

Meanwhile, water splitting is one of methods for producing hydrogen, which is a clean energy source, without generation of pollutants, and may be employed to produce electricity through a fuel cell that uses this hydrogen. Therefore, water splitting and fuel cell reactions are important technologies for realization of a hydrogen society.

A water electrolysis reaction consists of an oxygen evolution reaction (OER) and a hydrogen evolution reaction (HER), and a fuel cell reaction consists of an oxygen reduction reaction (ORR) and a hydrogen oxidation reaction (HOR). In actual water electrolysis and fuel cell systems, as described above, since a reverse voltage and a reverse current may flow under a specific operating condition to cause oxidation or corrosion of a catalyst, reversibility of the catalyst is an important factor.

Therefore, a hydrogen electrode of a fuel cell is required to possess water electrolysis performance to prevent carbon corrosion, and an electrode for water electrolysis is required to maintain the hydrogen evolution reaction when oxidized. However, Ir, which is mainly used as a water electrolysis catalyst, is problematic in that when oxidized, hydrogen evolution reaction and hydrogen oxidation reaction performances are degraded.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a catalyst having reversible catalytic activity, the catalyst being capable of effectively controlling a reverse voltage of a fuel cell by participating in a hydrogen oxidation reaction as well as a water splitting reaction, and provide a preparation method thereof.

However, the objectives of the present disclosure are not limited to the above-mentioned objective, and other objectives not mentioned will be clearly understood by those skilled in the art from the following description.

In order to achieve the above objective, according to one aspect of the present disclosure, there is provided an iridium alloy catalyst having reversible catalytic activity for an oxygen evolution reaction, a hydrogen evolution reaction, and a hydrogen oxidation reaction, the iridium alloy catalyst including: an iridium alloy including iridium (Ir) and nickel (Ni).

Furthermore, the iridium alloy may be an alloy including 1 to 100 parts by weight of nickel based on 100 parts by weight of iridium.

Furthermore, the iridium alloy catalyst may be a catalyst in which the iridium alloy is supported on a carbon-based support, and the iridium alloy catalyst may include 5 to 100 parts by weight of the iridium alloy based on 100 parts by weight of the carbon-based support.

Furthermore, the iridium alloy catalyst may have a particle size of 0.5 to 10 nm measured by a transmission electron microscope (TEM).

Furthermore, the iridium alloy catalyst may be rapidly converted to an iridium alloy catalyst in an oxide form and an iridium alloy catalyst in a metallic form according to applied voltage, the iridium alloy catalyst in the metallic form may catalyze the hydrogen evolution reaction and the hydrogen oxidation reaction, and the iridium alloy catalyst in the oxide form may catalyze the oxygen evolution reaction.

Furthermore, the iridium alloy catalyst may be used as a catalyst for an anode of a fuel cell.

Furthermore, the iridium alloy catalyst may be used as a catalyst for an electrode of a water electrolysis cell.

According to another aspect of the present disclosure, there is provided a method of preparing an iridium alloy catalyst, the method including: dispersing a carbon support, an iridium salt, and a nickel salt in water; carrying out drying to obtain powder; pulverizing the powder; and carrying out heat treatment to obtain an iridium alloy catalyst, wherein the heat treatment may be carried out at a temperature of 400 to 1000° C. under an inert condition while introducing a reducing gas.

According to still another aspect of the present disclosure, there is provided a fuel cell, including the iridium alloy catalyst as a catalyst for an anode.

According to yet another aspect of the present disclosure, there is provided a water electrolysis cell, including the iridium alloy catalyst.

The iridium alloy catalyst according to the present disclosure is rapidly converted to an iridium alloy catalyst in an oxide form and an iridium alloy catalyst in a metallic form according to applied voltage by controlling its crystallinity. Thus, even in case an oxide layer is formed after the oxygen evolution reaction (OER), the oxidation layer disappears during the hydrogen evolution reaction (HER) and hydrogen oxidation reaction (HOR) and the properties of an iridium metal catalyst remain, thereby maintaining HER/HOR performance.

The iridium alloy catalyst having reversible catalytic activity according to the present disclosure enables the oxygen evolution reaction (OER), the hydrogen evolution reaction (HER), and the hydrogen oxidation reaction (HOR), and thus can find application in a system requiring various electrochemical reactions. In addition, the iridium alloy catalyst can also find application in solving a reverse voltage problem of a fuel cell as well as a reverse current phenomenon of a bipolar plate of a water electrolysis system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objectives, features, and other advantages of the present disclosure will be more clearly understood from the following detailed description when taken in conjunction with the accompanying drawings, in which.

DETAILED DESCRIPTION OF THE INVENTION

Unless otherwise defined, all terms including technical and scientific terms used herein have the same meaning as commonly understood by one of ordinary skill in the art to which the present disclosure belongs. Throughout this specification and the claims, unless otherwise defined, the terms "comprise", "comprises", and "comprising" will be understood to imply the inclusion of a stated object, a step or groups of objects, and steps, but not the exclusion of any other objects, steps or groups of objects or steps.

Prior to describing the present disclosure in detail below, it should be understood that the terms used herein are merely intended to describe specific embodiments and are not to be construed as limiting the scope of the present disclosure, which is defined by the appended claims.

Meanwhile, unless otherwise noted, various embodiments of the present disclosure may be combined with any other embodiments. In particular, any feature which is mentioned preferably or favorably may be combined with any other features which may be mentioned preferably or favorably. Hereinafter, embodiments of the present disclosure and effects thereof will be described with reference to the accompanying drawings.

An iridium alloy catalyst according to an embodiment of the present disclosure is a catalyst having reversible catalytic activity, the catalyst enabling an oxygen evolution reaction (OER), a hydrogen evolution reaction (HER), and a hydrogen oxidation reaction (HOR), and is a catalyst in which an iridium alloy is supported on a carbon-based support and exhibits high crystallinity.

The iridium alloy catalyst includes 5 to 100 parts by weight of the iridium alloy based on 100 parts by weight of the carbon-based support. Preferably, the iridium alloy catalyst includes 5 to 50 parts by weight of the iridium alloy based on parts by weight of the carbon-based support.

The iridium alloy catalyst having reversible catalytic activity includes an alloy (IrNi) of iridium (Ir) and nickel (Ni) as an active metal, and nickel is included in an amount of to 100 parts by weight based on 100 parts by weight of iridium. Preferably, nickel is included in an amount of 20 to parts by weight based on 100 parts by weight of iridium.

The carbon-based support may be, but not limited to, a carbon-based support selected from carbon black, Ketjen black, carbon nanotubes, carbon nanofibers, graphite carbon, graphene, graphene oxide, and a mixture of two or more thereof.

The iridium alloy catalyst has a particle size of 0.5 to nm measured by a transmission electron microscope (TEM).

Figure 1:
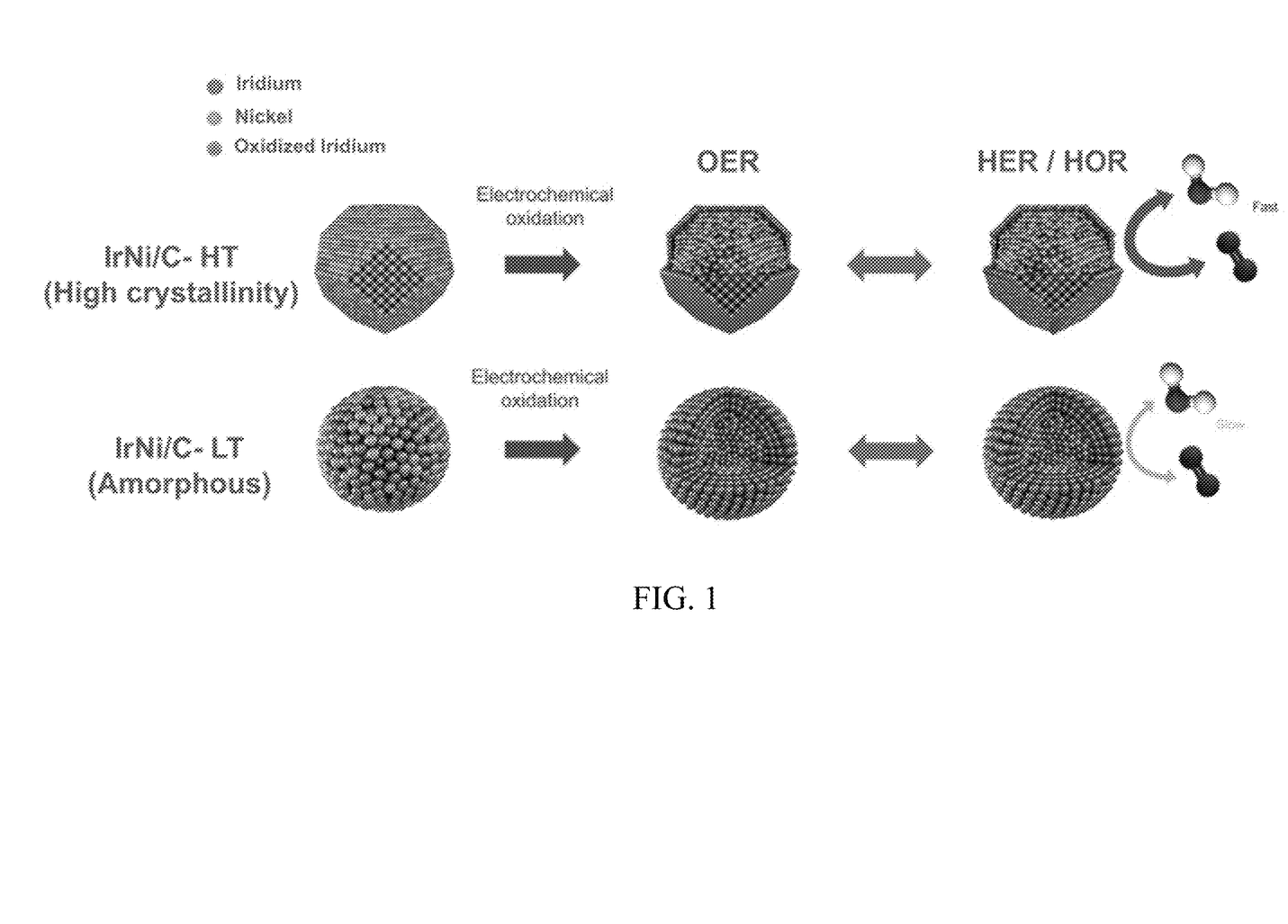
FIG. 1 is a view illustrating the properties of an iridium alloy catalyst according to an embodiment of the present disclosure.

The iridium alloy catalyst according to the embodiment of the present disclosure is characterized by high crystallinity. As illustrated in FIG. 1, an iridium alloy catalyst having low crystallinity generates a thick oxide layer after the oxygen evolution reaction, and in this case, the oxide layer exists even during the hydrogen evolution reaction and hydrogen oxidation reaction, which greatly reduces hydrogen evolution reaction/hydrogen oxidation reaction performance. On the other hand, in an iridium alloy catalyst having high crystallinity, a thin oxide layer is formed after the oxygen evolution reaction, but the oxide layer disappears during the hydrogen evolution reaction and hydrogen oxidation reaction and the properties of an iridium metal catalyst remain, thereby maintaining hydrogen evolution reaction/hydrogen oxidation reaction performance.

In addition, the iridium alloy catalyst according to the present disclosure is rapidly converted to an iridium alloy catalyst ($IrNiO_x/C$) in an oxide form and an iridium alloy catalyst (IrNi/C) in a metallic form according to applied voltage. Therefore, the iridium alloy catalyst in a metallic form catalyzes the hydrogen evolution reaction and the hydrogen oxidation reaction, and when water splitting proceeds, converted to an oxide form and catalyzes the oxygen evolution reaction. In a reduction atmosphere, the iridium alloy catalyst is converted to a metallic form due to its excellent reversibility, thereby facilitating the hydrogen evolution reaction and the hydrogen oxidation reaction.

An iridium catalyst, which is mainly used as a water electrolysis catalyst, is oxidized by an oxygen evolution reaction to be converted to iridium with an oxidized surface, and is difficult to convert to a metallic form, resulting in a degradation in hydrogen evolution reaction/hydrogen oxidation reaction performance.

In a preparation method of an iridium alloy catalyst according to the present disclosure, first, a dispersion process of dispersing a carbon support, an iridium salt, and a nickel salt in water is carried out, followed by a drying process to obtain powder. Thereafter, a pulverization process of pulverizing the obtained powder is carried out, followed by a heat treatment process to obtain an iridium alloy catalyst.

The carbon support, iridium salt, and nickel salt are added so that the carbon support, iridium, and nickel constitute the catalyst at the above-described ratio.

The dispersion process is carried out using a sonicator, and the drying process is carried out at 50 to 100° C. using a hot plate. The pulverization process is suitably carried out so that a final catalyst can have the above-described size.

In the heat treatment process, crystallinity of the catalyst is controlled by controlling a heat treatment temperature. Preferably, the crystallinity is controlled by controlling the temperature in the range of 300 to 1100° C., and the heat treatment process is carried out at 800 to 1100° C. in order to impart high crystallinity.

As supported by water electrolysis experimental examples to be described later, it can be seen that the iridium alloy catalyst having high crystallinity has reversible properties for oxygen oxidation and hydrogen evolution reactions. In addition, as supported by fuel cell experimental examples to be described later, it can be seen that the iridium alloy catalyst having high crystallinity has reversible properties for oxygen evolution and hydrogen oxidation reactions.

The heat treatment process includes a reduction process. In the heat treatment process, heat treatment is carried out at the above temperature under an inert condition, and oxide foam is removed by introducing a reducing gas, thereby optimizing activity of the catalyst. For example, preferably, the temperature is raised to the above range under a nitrogen condition, and then heat treatment is carried out for 3 to 10 minutes while adding 5 to 15% hydrogen relative to nitrogen.

After the heat treatment, the temperature is lowered to room temperature, followed by a washing process to obtain a final iridium alloy catalyst.

EXAMPLES AND COMPARATIVE EXAMPLES (1) Example 1 (IrNi/C-HT)

Carbon black, iridium acetate, and nickel acetate were dispersed in water using a sonicator, and then dried on a hot plate at 80° C. At this time, the weight ratio between carbon black and iridium metal was set to 9:1, and the weight ratio between iridium metal and nickel metal was set to 2:1. Then, after finely grinding the resultant powder, a heat treatment temperature was raised to 1000° C. under a nitrogen condition, and then 10% hydrogen relative to nitrogen was flowed at 1000° C. for 5 minutes. Finally, the temperature was lowered to room temperature, and the resultant powder was washed with water to recover a sample.

(2) Example 2 (IrNi/C-LT)

Carbon black, iridium acetate, and nickel acetate were dispersed in water using a sonicator, and then dried on a hot plate at 80° C. At this time, the weight ratio between carbon black and iridium metal was set to 9:1, and the weight ratio between iridium metal and nickel metal was set to 2:1. Then, after finely grinding the resultant powder, a heat treatment temperature was raised to 400° C. under a nitrogen condition, and then 10% hydrogen relative to nitrogen was flowed at 400° C. for 5 minutes. Finally, the temperature was lowered to room temperature, and the resultant powder was washed with water to recover a sample.

(3) Comparative Example 1 (Ir/C-HT)

Carbon black and iridium acetate were dispersed in water using a sonicator, and then dried on a hot plate at 80° C. At this time, the weight ratio between carbon black and iridium metal was set to 9:1. Then, after finely grinding the resultant powder, a heat treatment temperature was raised to 1000° C. under a nitrogen condition, and then 10% hydrogen relative to nitrogen was flowed at 1000° C. for 5 minutes. Finally, the temperature was lowered to room temperature, and the resultant powder was washed with water to recover a sample.

(4) Comparative Example 2 (Ir/C-LT)

Carbon black and iridium acetate were dispersed in water using a sonicator, and then dried on a hot plate at 80° C. At this time, the weight ratio between carbon black and iridium metal was set to 9:1. Then, after finely grinding the resultant powder, a heat treatment temperature was raised to 400° C. under a nitrogen condition, and then 10% hydrogen relative to nitrogen was flowed at 400° C. for 5 minutes. Finally, the temperature was lowered to room temperature, and the resultant powder was washed with water to recover a sample.

(5) Comparative Example 3 (TKK Pt/C)

For comparison with a commercially available catalyst, Pt/C (TEC10E50, TKK Corp.) was prepared.

EXPERIMENTAL EXAMPLE (1) X-Ray Diffraction (XRD) Measurement

Figure 2:
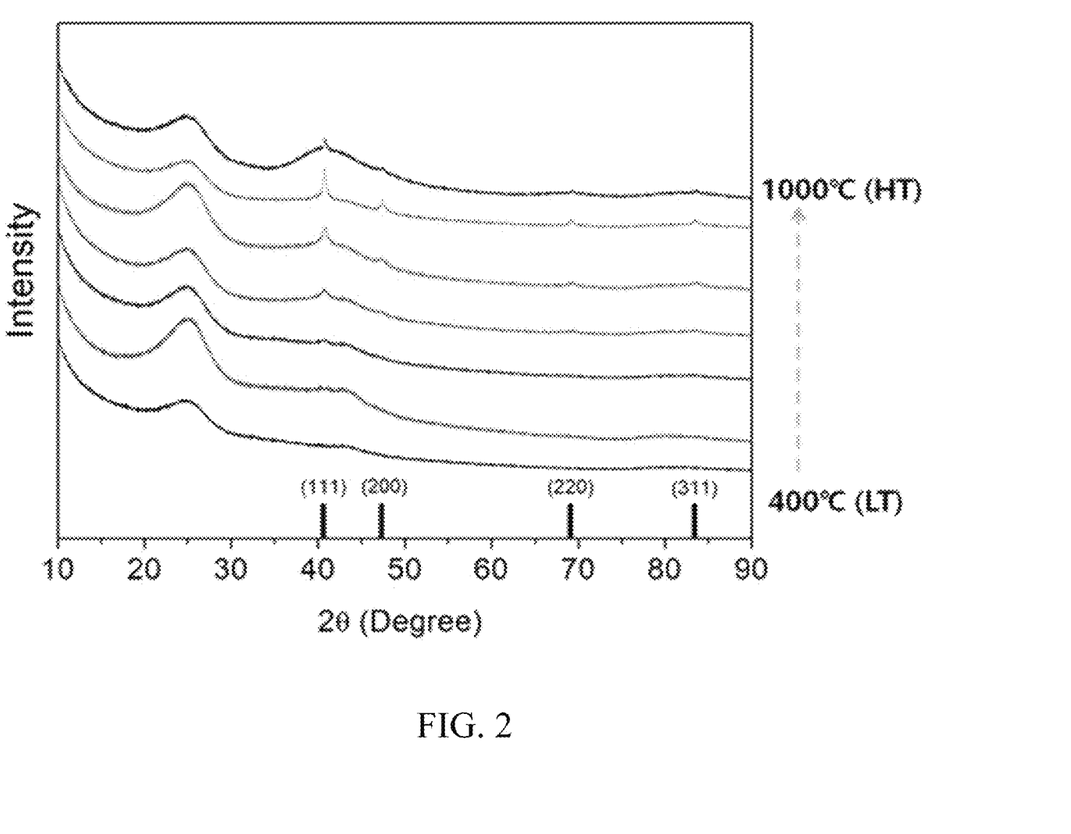
FIG. 2 is a graph illustrating the results of X-ray diffraction (XRD) measurement according to preparation temperature on the iridium alloy catalyst according to the embodiment of the present disclosure.

FIG. 2 illustrates the results of XRD pattern analysis of an iridium alloy catalyst according to preparation temperature. When preparing the catalyst, crystallinity was controlled by changing the temperature from 400 to 1000° C. From the results illustrated in FIG. 2, it can be seen that as the preparation temperature increases, the peak for a (111) plane tends to increase, thereby increasing the crystallinity.

Figure 3:
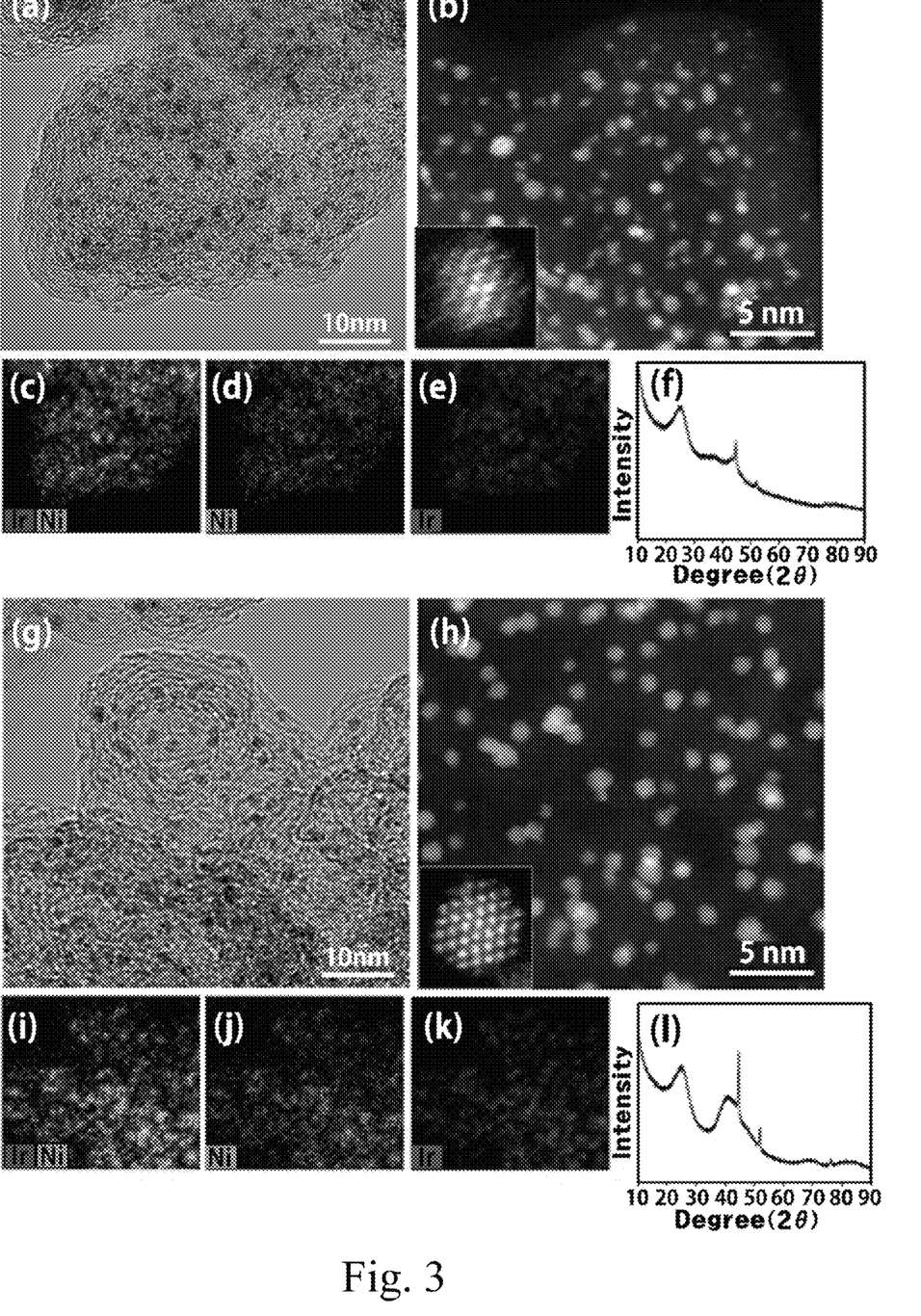
FIG. 3 is images illustrating the results of transmission electron microscopy (TEM), energy-dispersive X-ray spectroscopy (EDX), and X-ray diffraction (XRD) measurement on the iridium alloy catalyst according to the embodiment of the present disclosure.

(2) Transmission Electron Microscopy (TEM) and Energy-Dispersive X-Ray Spectroscopy (EDX) Measurement FIG. 3 illustrates TEM and EDX measurement images of the IrNi/C-HT catalyst (Example 1) and IrNi/C-LT catalyst (Example 2) prepared in the above Examples. FIG. 3 (a) to (f) are measurement images of an iridium alloy catalyst formed at low temperature and thus having low crystallinity, and FIG. 3 (g) to (l) are measurement images of an iridium alloy catalyst formed at high temperature and thus having high crystallinity.

From the results illustrated in FIG. 3, it can be seen that iridium and nickel were distributed homogeneously in both alloys. However, as illustrated in FIGS. 3 (b) and (h), crystallinity of the iridium alloy catalyst formed at high temperature is higher than that of the iridium alloy catalyst formed at low temperature.

(3) Measurement of Electrochemical Properties

Figure 4:
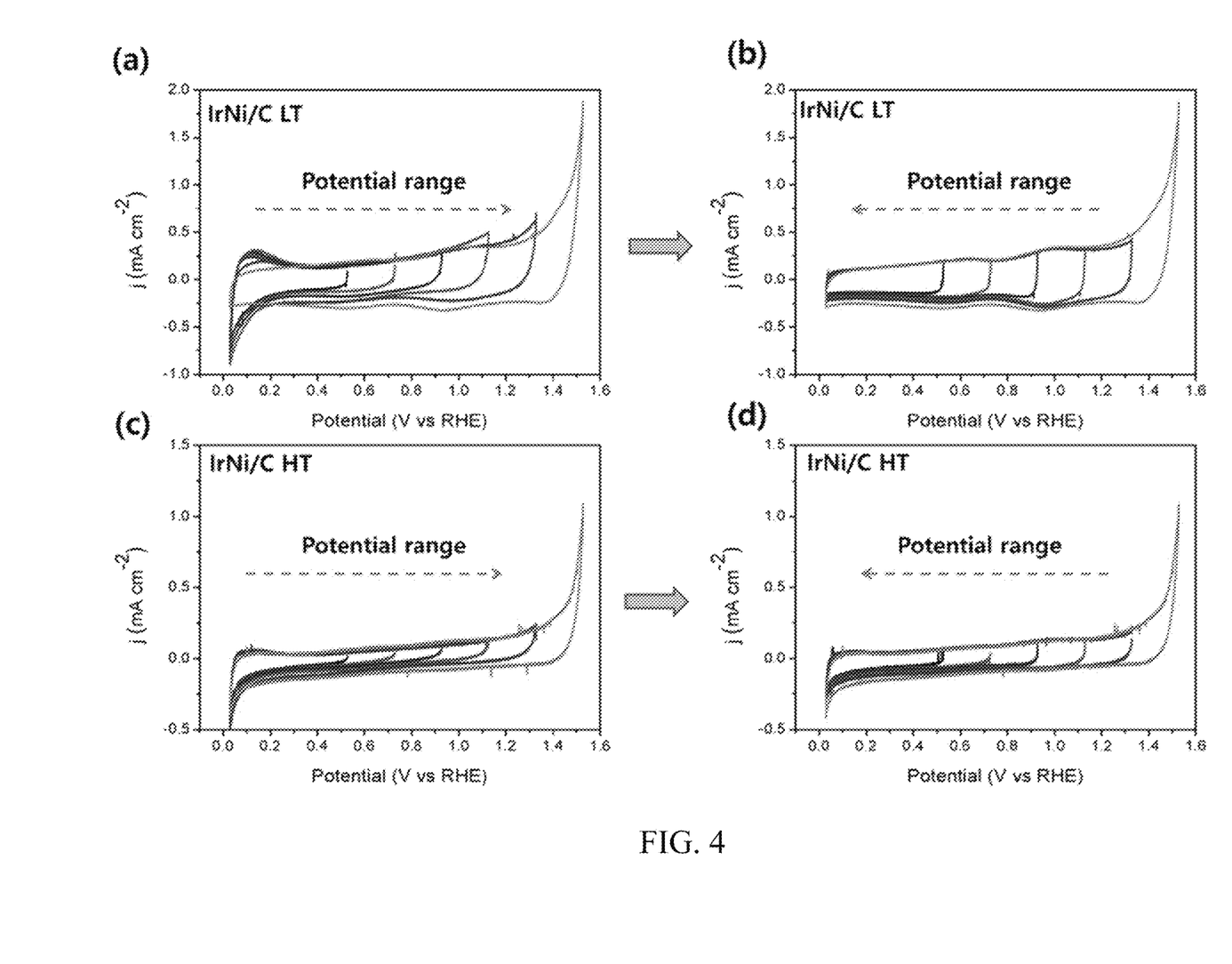
FIG. 4 is graphs illustrating the results of measuring electrochemical properties of the iridium alloy catalyst according to the embodiment of the present disclosure.

FIG. 4 illustrates the results of measuring electrochemical properties of the IrNi/C-HT catalyst (Example 1) and IrNi/C-LT catalyst (Example 2) prepared in the above Examples.

In the case of particles with low crystallinity, from the results illustrated in FIG. 4 (a), it can be seen that the hydrogen adsorption peak indicating metallic properties gradually decreases as the voltage increases from a low level to a high level. On the other hand, from the results illustrated in FIG. 4 (b), it can be seen that the particles are completely converted to iridium oxide as the voltage decreases from a high level to a low level, and exhibit oxide properties at a low voltage level without conversion to metal. That is, it can be seen that irreversibility is exhibited.

In the case of particles with high crystallinity, from the results illustrated in FIGS. 4 (c) and (d), it can be seen that the hydrogen adsorption peak decreases as the voltage increases, but still exists, so that the particles are converted to iridium oxide at a high voltage level and reversely converted to metal again, thus exhibiting reversibility.

Figure 5:
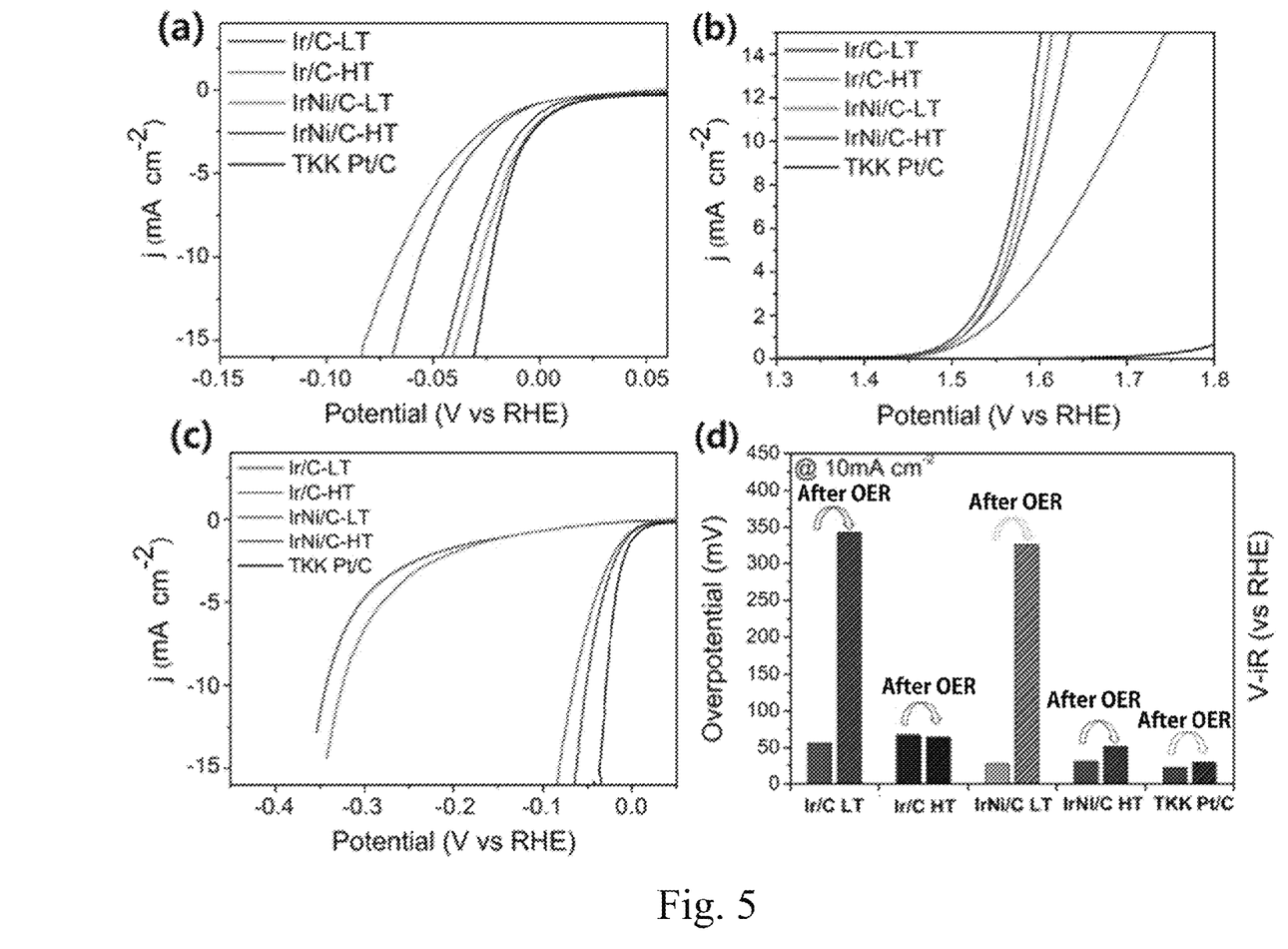
FIG. 5 is graphs illustrating the results of measuring hydrogen evolution reaction (HER)/oxygen evolution reaction (OER) performance and reversibility of the iridium alloy catalyst according to the embodiment of the present disclosure.

(4) Measurement of Oxygen Evolution Reaction Performance, Hydrogen Evolution Reaction Performance, and Reversibility of Catalyst FIG. 5 illustrates the results of measuring the performance for hydrogen evolution reaction (FIG. 5 (a)), oxygen evolution reaction (FIG. 5 (b)), and hydrogen evolution reaction after oxygen evolution reaction (FIG. 5 (c)) on the IrNi/C-HT catalyst (Example 1), IrNi/C-LT catalyst (Example 2), Ir/C-HT catalyst (Comparative Example 1), Ir/C-LT catalyst (Comparative Example 2), and TKK Pt/C catalyst (Comparative Example 3) prepared in the above Examples and Comparative Examples. FIG. 5 (d) illustrates the results of measuring overpotential before/after oxygen evolution reaction at 10 mA/cm² for each catalyst.

From the results illustrated in FIG. 5 (a), it can be seen that in the case of hydrogen evolution reaction performance, the performance of the iridium alloy catalysts is superior to that of the iridium catalysts, and is similar to that of the platinum catalyst, which is known to have the best performance. From the results illustrated in FIG. 5 (b), it can be seen that in the case of oxygen evolution reaction performance, the performance of the iridium alloy catalysts is superior to that of the iridium catalysts. From the results illustrated in FIGS. 5 (c) and (d), it can be seen that in the case of hydrogen evolution performance after oxygen evolution reaction, the performance of the iridium and iridium alloy catalysts with low crystallinity significantly decreases, while the performance of the iridium alloy catalyst with high crystallinity is maintained.

Figure 6:
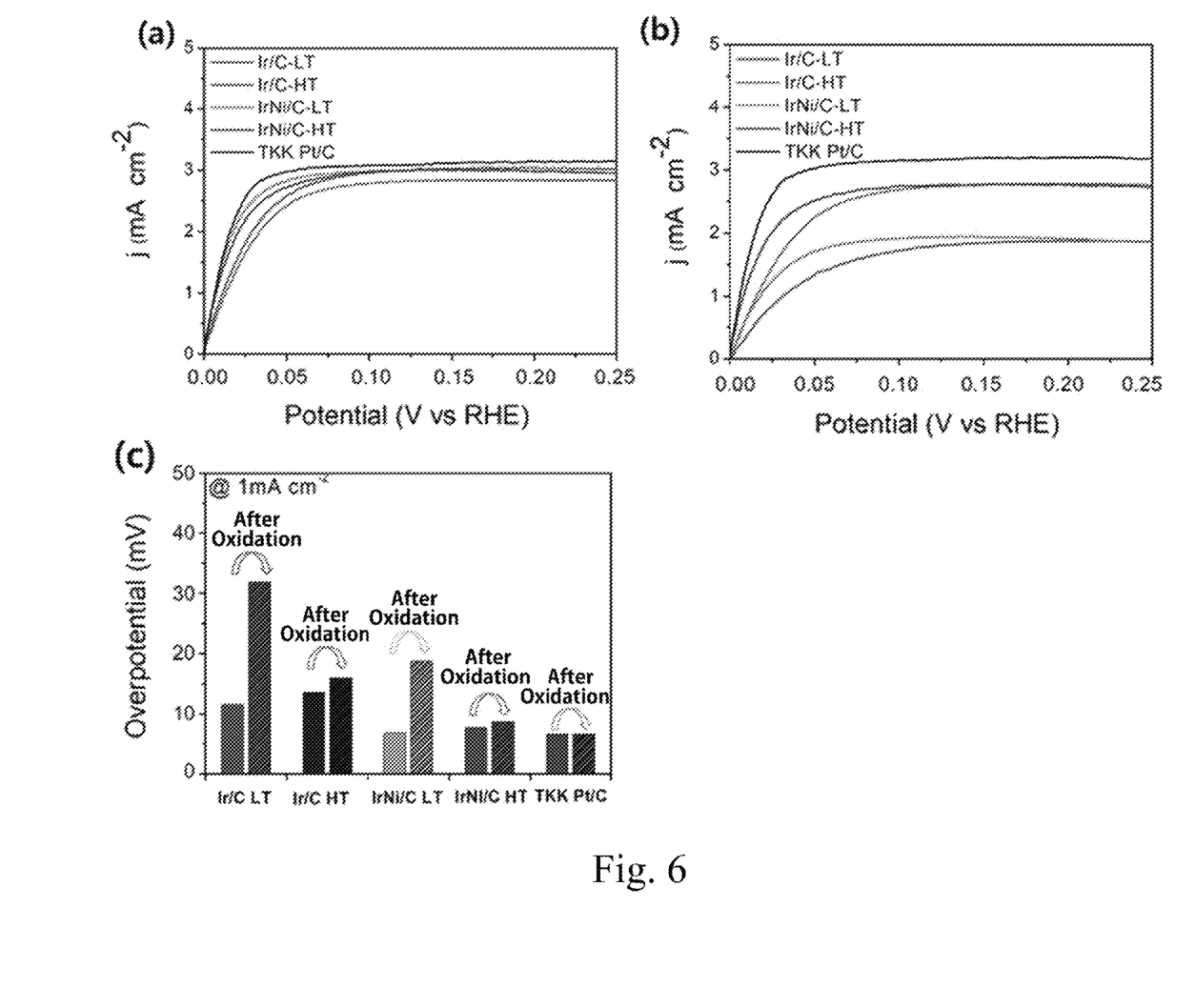
FIG. 6 is graphs illustrating the results of measuring hydrogen oxidation reaction (HOR) performance and reversibility of the iridium alloy catalyst according to the embodiment of the present disclosure.

(5) Measurement of Hydrogen Oxidation Reaction Performance and Reversibility of Catalyst FIG. 6 illustrates the results of measuring the performance for hydrogen oxidation reaction (FIG. 6 (a)) and hydrogen oxidation reaction after oxygen evolution reaction (FIG. 6 (b)) on the IrNi/C-HT catalyst (Example 1), IrNi/C-LT catalyst (Example 2), Ir/C-HT catalyst (Comparative Example 1), Ir/C-LT catalyst (Comparative Example 2), and TKK Pt/C catalyst (Comparative Example 3) prepared in the above Examples and Comparative Examples. FIG. 6 (c) illustrates the results of measuring overpotential before/after oxygen evolution reaction at 1 mA/cm² for each catalyst.

From the results illustrated in FIG. 6 (a), it can be seen that in the case of hydrogen oxidation reaction performance, the performance of the iridium alloy catalysts is superior to that of the iridium catalysts, and is similar to that of the platinum catalyst, which is known to have the best performance. From the results illustrated in FIGS. 6 (b) and (c), it can be seen that in the case of hydrogen oxidation performance after oxygen evolution reaction, the performance of the iridium and iridium alloy catalysts with low crystallinity significantly decreases, while the performance of the iridium alloy catalyst with high crystallinity is maintained.

(6) Water Electrolysis Reverse Voltage Test on Catalyst

Figure 7:
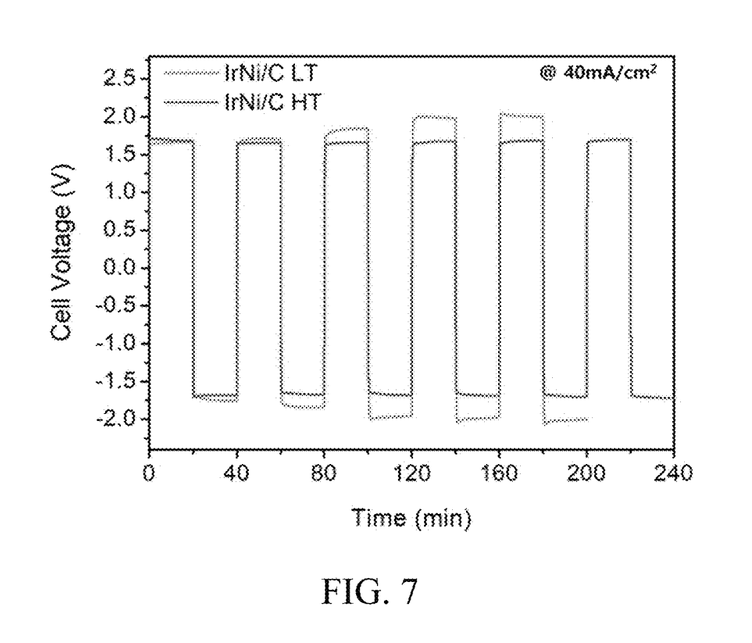
FIG. 7 is a graph illustrating the results of a water electrolysis reverse voltage test on the iridium alloy catalyst according to the embodiment of the present disclosure.

FIG. 7 illustrates the results of measuring cell voltage V by carrying out a water electrolysis reaction on the IrNi/C-HT catalyst and IrNi/C-LT catalyst prepared in the above Examples by applying a reverse voltage every 20 minutes in a water electrolysis cell with an area of 10 cm². As illustrated in FIG. 7, it can be seen that the iridium alloy catalyst with low crystallinity rapidly decreases in performance during the test, while the iridium alloy catalyst with high crystallinity maintains performance and exhibits strong durability under application of reverse voltage. Therefore, it can be seen that reversibility of oxygen oxidation reaction/hydrogen evolution reaction performance of the iridium alloy catalyst with high crystallinity according to the present disclosure is also applied to an actual electrode for water electrolysis.

(7) Fuel Cell Reverse Voltage Test on Catalyst

Figure 8:
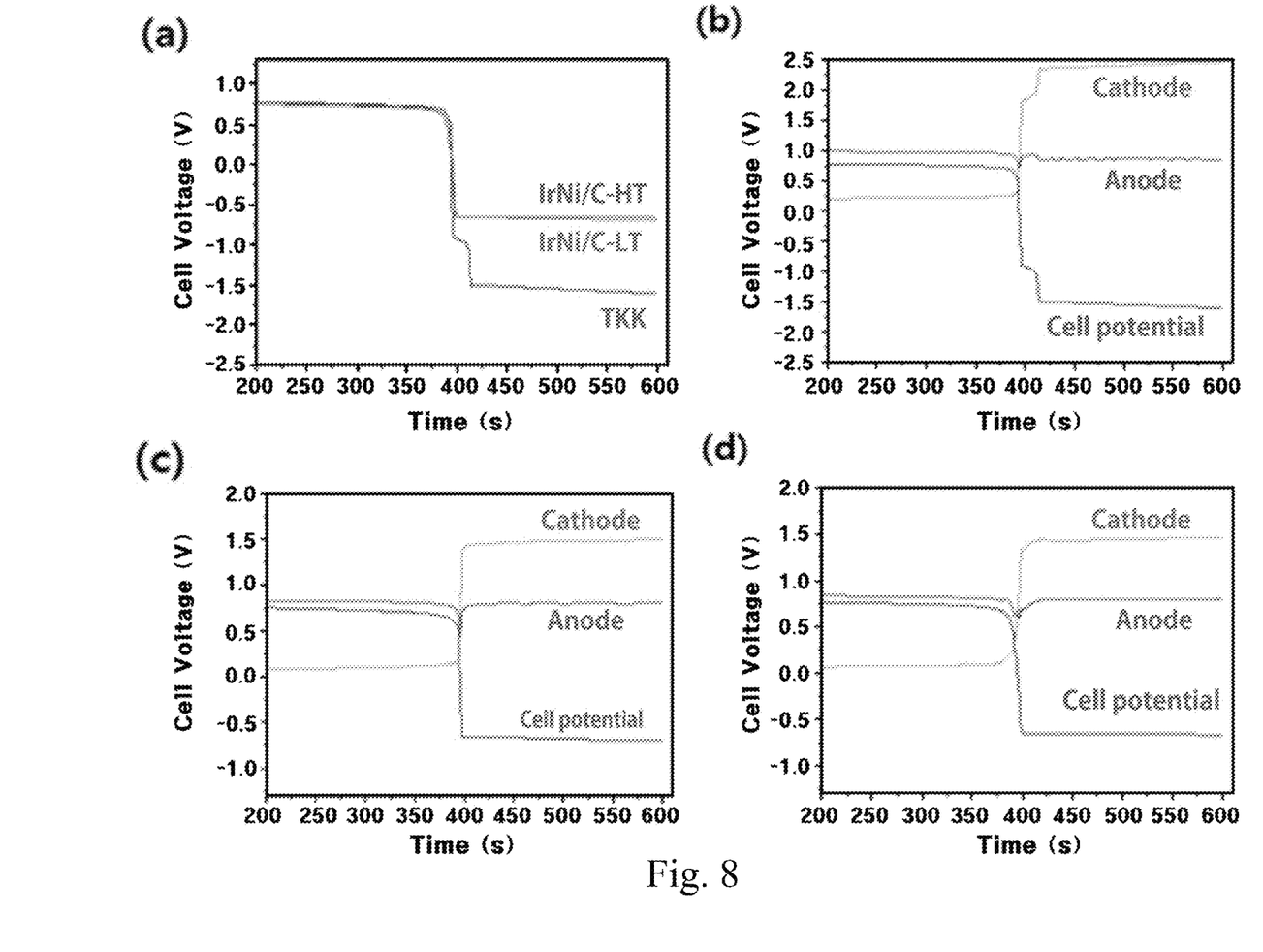
FIG. 8 is graphs illustrating the results of a fuel cell reverse voltage test on the iridium alloy catalyst according to the present disclosure and a carbon-supported platinum catalyst.

FIG. 8 (a) illustrates the results of measuring cell voltage V by carrying out a reverse voltage test on the IrNi/C-HT catalyst (Example 1), IrNi/C-LT catalyst (Example 2), and TKK Pt/C catalyst (Comparative Example 3) by changing hydrogen to argon while maintaining a current of 100 mA/cm² in a fuel cell with an area of 5 cm². In addition, FIGS. 8 (b), (c), and (d) illustrate cell voltage and anode and cathode voltages of TKK Pt/C, IrNi/C-LT, and IrNi/C-HT, respectively. From the results illustrated in FIG. 8, it can be seen that in the case of the IrNi/C-LT and IrNi/C-HT catalysts, water electrolysis occurs instead of hydrogen oxidation thus exhibiting a low reverse voltage, while in the case of the TKK Pt/C catalyst, carbon corrosion occurs thus exhibiting a high reverse voltage.

Figure 9:
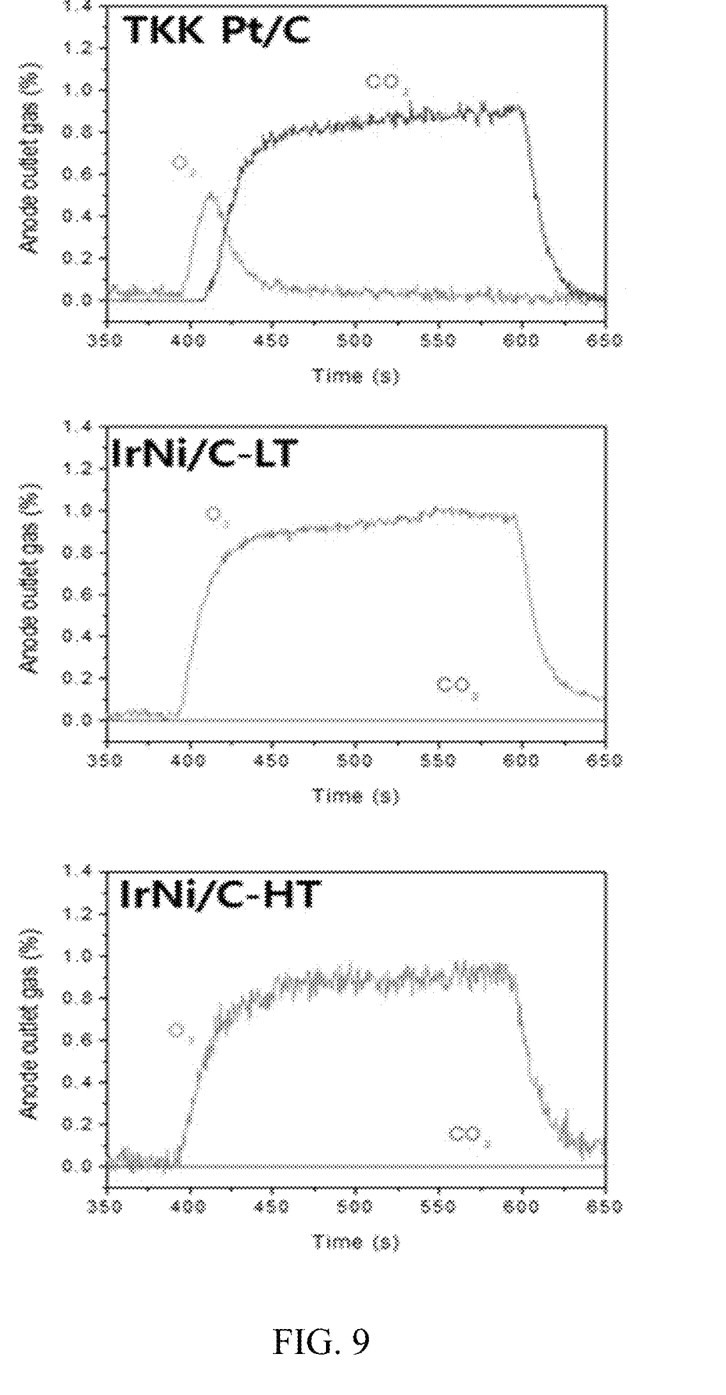
FIG. 9 is a view of graphs illustrating the amount of gas generated during the fuel cell reverse voltage test on the iridium alloy catalyst according to the present disclosure and the carbon-supported platinum catalyst.

FIG. 9 illustrates the results of carrying out gas analysis during the reverse voltage test to examine reaction under application of reverse voltage. From the results illustrated in FIG. 9, it can be seen that in the case of the TKK Pt/C catalyst, carbon corrosion occurs, generating a lot of carbon dioxide, while in the case of the IrNi/C-LT and IrNi/C-HT catalysts, water electrolysis occurs and thus no carbon corrosion occurs.

Figure 10:
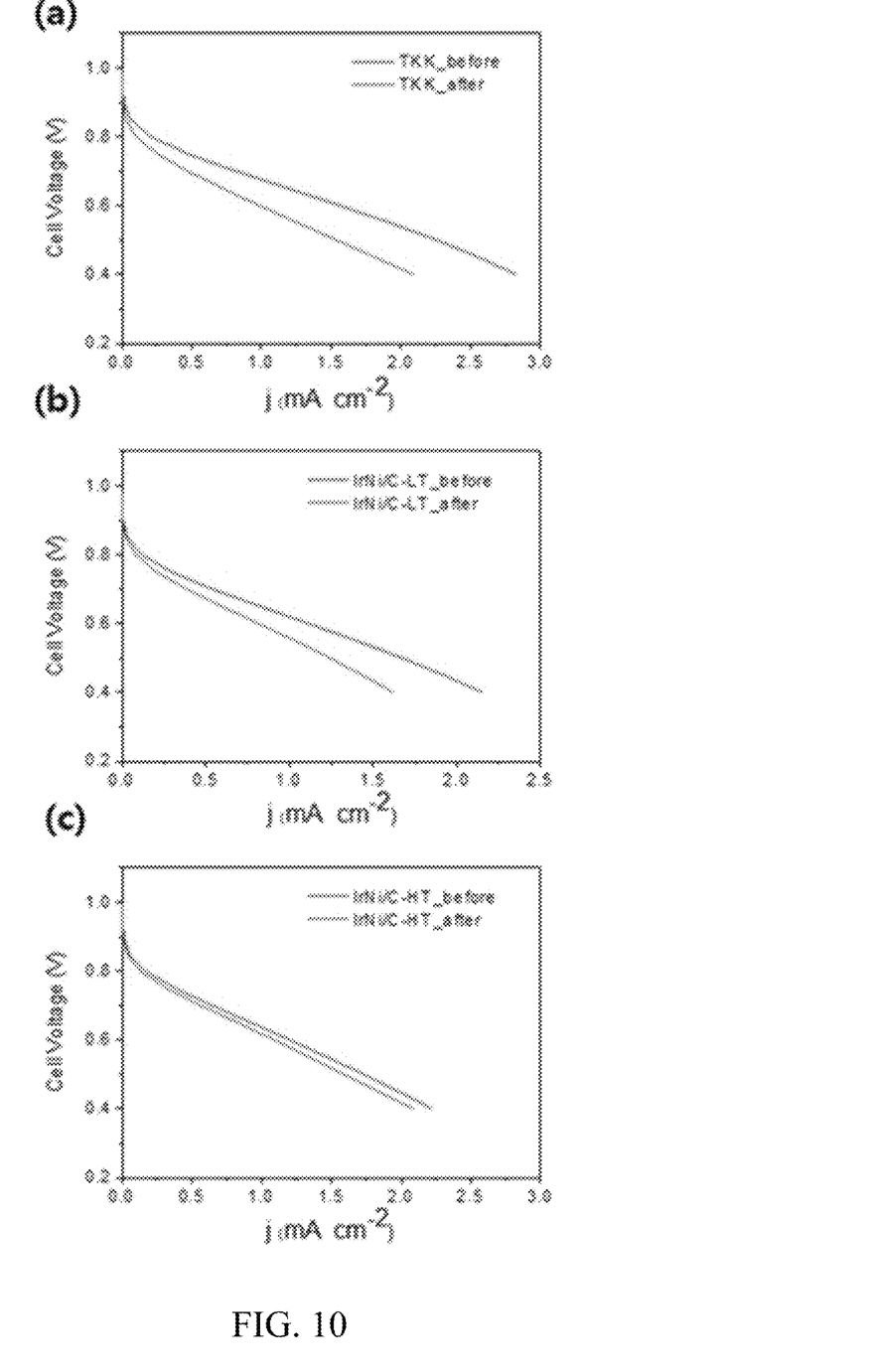
FIG. 10 is graphs illustrating the fuel cell performance before and after application of a fuel cell reverse voltage to the iridium alloy catalyst according to the present disclosure and the carbon-supported platinum catalyst.

FIG. 10 illustrates the results of comparing fuel cell performance before and after application of reverse voltage. From the results illustrated in FIG. 10, it can be seen that the TKK Pt/C catalyst exhibits low performance after application of reverse voltage due to occurrence of carbon corrosion. It also can be seen that in the case of the IrNi/C-LT catalyst, water electrolysis occurs under a reverse voltage condition and thus no carbon corrosion occurs, but performance is poor due to no reversibility, while in the case of the IrNi/C-HT catalyst, water electrolysis occurs under a reverse voltage condition and thus no carbon corrosion occurs, and performance is maintained due to reversibility.

The features, structures, effects, and the like illustrated in each embodiment may be combined or modified to other embodiments by those skilled in the art. Therefore, contents related to the combination or the modification should be interpreted to be included in the scope of the present disclosure.

What is claimed is:

1. An iridium alloy catalyst having reversible catalytic activity for an oxygen evolution reaction, a hydrogen evolution reaction, and a hydrogen oxidation reaction, the iridium alloy catalyst comprising:
    an iridium alloy including iridium (Ir) and nickel (Ni).

2. The iridium alloy catalyst of claim 1, wherein the iridium alloy is an alloy including 1 to 100 parts by weight of nickel based on 100 parts by weight of iridium.

3. The iridium alloy catalyst of claim 1, wherein the iridium alloy catalyst is a catalyst in which the iridium alloy is supported on a carbon-based support, and
    the iridium alloy catalyst includes 5 to 100 parts by weight of the iridium alloy based on 100 parts by weight of the carbon-based support.

4. The iridium alloy catalyst of claim 1, wherein the iridium alloy catalyst has a particle size of 0.5 to 10 nm measured by a transmission electron microscope (TEM).

5. The iridium alloy catalyst of claim 1, wherein the iridium alloy catalyst is rapidly converted to an iridium alloy catalyst in an oxide form and an iridium alloy catalyst in a metallic form according to applied voltage,
    the iridium alloy catalyst in the metallic form catalyzes the hydrogen evolution reaction and the hydrogen oxidation reaction,
    and the iridium alloy catalyst in the oxide form catalyzes the oxygen evolution reaction.

6. The iridium alloy catalyst of claim 1, wherein the iridium alloy catalyst is used as a catalyst for an anode of a fuel cell.

7. The iridium alloy catalyst of claim 1, wherein the iridium alloy catalyst is used as a catalyst for an electrode of a water electrolysis cell.

8. A water electrolysis cell, comprising the iridium alloy catalyst of claim 1.

9. A method of preparing an iridium alloy catalyst, the method comprising:
    dispersing a carbon support, an iridium salt, and a nickel salt in water;
    carrying out drying to obtain powder;
    pulverizing the powder; and
    carrying out heat treatment to obtain an iridium alloy catalyst,
    wherein the heat treatment is carried out at a temperature of 400 to 1000° C. under an inert condition while introducing a reducing gas.

10. A fuel cell, comprising the iridium alloy catalyst of claim 1 as a catalyst for an anode.

* * * * *